(12) United States Patent
VanRenesse

(10) Patent No.: US 7,756,995 B1
(45) Date of Patent: Jul. 13, 2010

(54) REGULATING TRANSMISSION RATES

(75) Inventor: Robbert VanRenesse, Ithaca, NY (US)

(73) Assignee: Amazon Technologies, Inc., Reno, NV (US)

( * ) Notice: Subject to any disclaimer, the term of this patent is extended or adjusted under 35 U.S.C. 154(b) by 610 days.

(21) Appl. No.: 11/692,882

(22) Filed: Mar. 28, 2007

(51) Int. Cl.
*G06F 13/00* (2006.01)

(52) U.S. Cl. .................. 709/233; 709/224; 709/250

(58) Field of Classification Search .......... 709/230, 709/232, 233, 224, 223, 250
See application file for complete search history.

(56) References Cited

U.S. PATENT DOCUMENTS

| | | | |
|---|---|---|---|
| 6,343,299 B1 | 1/2002 | Huang et al. | |
| 6,745,303 B2 | 6/2004 | Watanabe | |
| 7,149,761 B2 | 12/2006 | Cooke et al. | |
| 7,215,653 B2* | 5/2007 | Kim et al. | 370/329 |
| 7,222,141 B2 | 5/2007 | Zondervan et al. | |
| 7,392,016 B2* | 6/2008 | Tsien et al. | 455/67.11 |
| 7,450,508 B2* | 11/2008 | Cha et al. | 370/232 |
| 7,526,513 B2 | 4/2009 | Lees et al. | |
| 2003/0130984 A1 | 7/2003 | Quinlan et al. | |
| 2003/0131025 A1 | 7/2003 | Zondervan et al. | |
| 2005/0055456 A1* | 3/2005 | Chalupsky et al. | 709/233 |
| 2007/0112880 A1 | 5/2007 | Yang et al. | |
| 2007/0220220 A1 | 9/2007 | Ziv et al. | |
| 2008/0125134 A1* | 5/2008 | Usuda et al. | 455/452.1 |

OTHER PUBLICATIONS

Byers, J., et al., "Fast Approximate Reconciliation of Set Differences," Technical Report 2002-019, CS Dept. Boston University, Jul. 2002.

Cavendish, D., et al., "Rate-Based Congestion Control for Multicast ABR Traffic," Proceedings of the GLOBECOM, London, UK, Nov. 1996, pp. 1114-1118.

Danzig, P.B., "Flow Control for Limited Buffer Multicast," IEEE Transactions on Software Engineering, 20(1):1-12, Jan. 1994.

Demers, A., et al., "Epidemic Algorithms for Replicated Database Maintenance," Proceedings of the 6th ACM Symposium on Principles of Distributed Computing, Vancouver, BC, Aug. 1987, pp. 1-12.

Gau, R.-H., et al., "On Multicast Flow Control for Heterogeneous Receivers," IEEE/ACM Transactions on Networking 10(1):86-101, Feb. 2002.

Jacobson, V., "Congestion Avoidance and Control," ACM SIGCOMM '88, Stanford, CA, Aug. 1988, pp. 314-329.

Johansen, H., et al., "Fireflies: Scalable Support for Intrusion-Tolerant Network Overlays," Proceedings of EuroSys'06, ACM European Chapter, Leuven, Belgium, Apr. 18-21, 2006.

(Continued)

*Primary Examiner*—Viet Vu
(74) *Attorney, Agent, or Firm*—Knobbe Martens Olson & Bear LLP

(57) ABSTRACT

Techniques for reducing propagation delay and message loss within a network when replicating information among host computing devices are provided. To maintain flow control among host computing devices, a distributed transmission rate for host computing devices is allocated. Host computing devices adjust the transmission rate based on determined use by each host computing device. Individual host computing devices can also reduce propagation delay and message loss when replicating information by adjusting the number of updates produced based on overflow detections.

27 Claims, 11 Drawing Sheets

OTHER PUBLICATIONS

Minsky, Y., et al., "Set Reconciliation With Nearly Optimal Communication Complexity," IEEE Transactions on Information Theory 49(9):2212-2218, Sep. 2003.

Vicisano, L., et al., TCP-Like Congestion Control for Layered Multicast Data Transfer, Proceedings of IEEE INFOCOM, 1998.

* cited by examiner

Fig.2B.

| HOST M | Version # |
|--------|-----------|
| $A_M$  | 1         |
| $B_M$  | 12        |
| $C_M$  | 3         |
| $D_M$  | 13        |

CURRENT VERSION: 13

Fig.2A.

| HOST M | Version # |
|--------|-----------|
| $A_M$  | 1         |
| $B_M$  | 12        |
| $C_M$  | 3         |
| $D_M$  | 4         |

CURRENT VERSION: 12

REGULATING TRANSMISSION RATES

BACKGROUND

Often, a computing device maintains data on a database, a list, a table, or a storage system. Such data can include state information relating to a set of variables that can correspond to operating system information, transmission information, and the like. The computing device can maintain local state information related to variable values associated with the particular computing device as well as state information regarding variable values for a number of additional connected computing devices. Because each computing device's state information may change, the modified state information is replicated from one computing device to the next through a network. Replication is a mechanism in which information held on a computing device is copied to one or more connected computing devices, all of which provide access to the same set of data. The term "replication" usually implies how to copy the entire source data collection or parts of it which have changed since the last replication.

In one form of replication, each computing device could continuously transmit its state information to every other computing device. In a special form of replication, often referred to as gossiping, state information about other connected computing devices maintained on a local computing device is exchanged from one computing device to another. As the process is repeated, a network of computing devices can update state information.

In order to facilitate the replication of information between two networked computing devices, reconciliation schemes are frequently implemented. Early reconciliation schemes involved merge operations between the information maintained on each host computing device. In its most basic form, a first host computing device would send all its data to a second host computing device. The second host computing device would simultaneously send all its data to the first host computing device. Consequently, each host updated its data based on the received information if the data was newer. Eventually, after sending and updating data between each host computing device, information would be resolved among all the host computing devices connected to the network. Early reconciliation schemes suffered from inefficiency. Under high update load and limited available network bandwidth, the amount of updated data introduced into the network would cause backlogs if significant. Consequently, backlogs caused message losses to occur for each host computing device and resulted in host computing devices having outdated information.

Compounding the backlogs and message losses due to reconciling host computing device information, each host computing device tried to transmit as much as information as it could to the other hosts. Because transmission information was stored locally on each host, host computing devices had no way of sharing bandwidth fairly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for regulating transmission rates for a plurality of host computing devices is presented. The method obtains a remote transmission rate from a connected host and determines a distributed transmission rate, wherein the distributed transmission rate corresponds to the remote transmission rate and a current transmission rate. After determining the distributed transmission rate, the method obtains a remote current variable version value from the connected host, wherein the remote current variable version value corresponds to a maximum version value for one or more variables of corresponding state information about the host computing device on a remote data store. A determination of whether the remote current variable version value is greater than a current variable version value is made. The method updates variable values for the state information about the host computing device on the data store according to the distributed transmission rate corresponding to variable values on the remote data store if the variables from the remote data store are associated with a version greater than the current variable version value of the data store. Further, the method transmits to the connected host according to the distributed transmission rate variable values for the state information about the host computing device on the data store having a version greater than the remote current variable version value. The method adjusts the distributed transmission rate corresponding to determined use.

In accordance with another aspect of the present invention, a computer-readable media storing instructions for causing at least one processor to perform a method for regulating transmission rates for a plurality of host computing devices is presented. The method includes obtaining a remote transmission rate from a connected host and determining a distributed transmission rate, wherein the distributed transmission rate corresponds to the remote transmission rate and a current transmission rate. Next, the method obtains a remote current variable version value from the connected host, wherein the remote current variable version value corresponds to a maximum version value of state information on a remote data store. The state information is associated with one or more variables about a host computing device on the remote data store with each variable having a version. The method determines whether the remote current variable version value is greater than a current variable version value, wherein the current variable version value corresponds to a maximum version value of the state information on a data store. The state information is associated with one or more variables about the host computing device on the data store with each variable having a version.

The method updates the variable value for the state information about the host computing device on the data store with a variable value of the state information about the host computing device on the remote data store according to the distributed transmission rate if the remote current variable version value is greater than the current variable version value. Otherwise, the method transmits the variable value for the state information about the host computing device to the remote data store according to the distributed transmission rate if the current variable version value is greater than the remote current variable version value. After updating or transmitting, the method adjusts the distributed transmission rate corresponding to determined use.

In accordance with yet another aspect of the present invention, a system for regulating transmission rates between two or more host computing devices within a network is presented. The system includes a first host having a first transmission rate and maintaining at least one state having one or more variables about a host computing device stored in a first data store. Each variable is associated with a version for tracking the variable. The first host also maintains a first current variable version value for the at least one state corresponding to a maximum version value for the one or more variables of the at least one state on the first data store.

The system includes a second host having a second transmission rate and maintaining the at least one state having one or more variables about the host computing device stored in a second data store. Each variable is associated with a version for tracking the variable. The second host maintains a second current variable version value for the at least one state associated with a maximum version value for the one or more variables of the at least one state on the second data store.

The first host updates variable values on the first data store corresponding to variable values from the second data store according to the distributed transmission rate if the variables from the second data store of the at least one state are associated with a version greater than the first current variable version value on the first data store.

In accordance with an aspect of the present invention, a method for transmitting state information is presented. The method obtains a remote current variable version value of state information from a connected host, wherein the remote current variable version value corresponds to a maximum version value for the state information on a remote data store, the state information having one or more variables with each variable having a version. The method determines whether the remote current variable version value is greater than a current variable version value, wherein the current variable version value corresponds to a maximum version value for the state information on a data store, the state information having one or more variables with each variable having a version.

Following, the method transmits to the connected host one or more variables on the data store having a version greater than the remote current variable version value through one or more updates. The one or more updates are produced and placed throughout a transmission window, the transmission window corresponding to a maximum number of updates that can be sent over a period of time. The method adjusts the number of produced updates based on network conditions.

In accordance with another aspect of the present invention, a method that transmits state information is presented. The method obtains a remote current variable version value of state information from a connected host, wherein the remote current variable version value corresponds to a maximum version value for the state information on a remote data store, the state information having one or more variables with each variable having a version. The method determines whether the remote current variable version value is greater than a current variable version value, wherein the current variable version value corresponds to a maximum version value for the state information on a data store, the state information having one or more variables with each variable having a version. Afterwards, the method transmits to the connected host one or more variables on the data store having a version greater than the remote current variable version value through one or more updates, wherein the one or more updates are produced and placed throughout a transmission window, the transmission window corresponding to a maximum number of updates that can be sent over a period of time. The method decreases the number of updates produced for transmission by a factor when an overflow occurs. Otherwise the method increases the number of updates produced for transmission by a factor when successfully sending the number of updates throughout a previous transmission window.

In still yet another aspect of the present invention, an apparatus for adjusting a number of updates produced is presented. The apparatus includes a data store for storing state information, wherein state information on the data store includes one or more variables with each variable having a version. An interface for communicating with a connected host is included on the apparatus. The apparatus further has a data processing component having an executable component on the host. When executed, the data processing component determines a current variable version value of a state on the data store, wherein the current variable version value corresponds to a maximum version value for one or more variables for the state on the data store. The component, when further executed, obtains a remote current variable version value of the state from the connected host, wherein the remote current variable version value corresponds to a maximum version value for one or more variables for the state on a remote data store and determines whether the current variable version value is greater than the remote current variable version value. The component transmits to the connected host one or more variables on the data store having a version greater than the remote current variable version value through one or more updates, wherein the one or more updates are produced and placed throughout a transmission window, the transmission window corresponding to a maximum number of updates that can be sent over a period of time. After, the component adjusts the number of produced updates based on network conditions.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A and 2B are block diagrams depicting state information including sets of variables and their associated versions on a data store for a computing device in accordance with an aspect of the present invention;

FIGS. 7A and 7B are block diagrams illustrating variables of a state on host computing devices being updated based on version values in accordance with an aspect of the present invention;

FIGS. 8A and 8B are block diagrams further showing a computing device updating state information from another computing device with a newer version of a variable in accordance with an aspect of the present invention;

DETAILED DESCRIPTION

Figure 1:
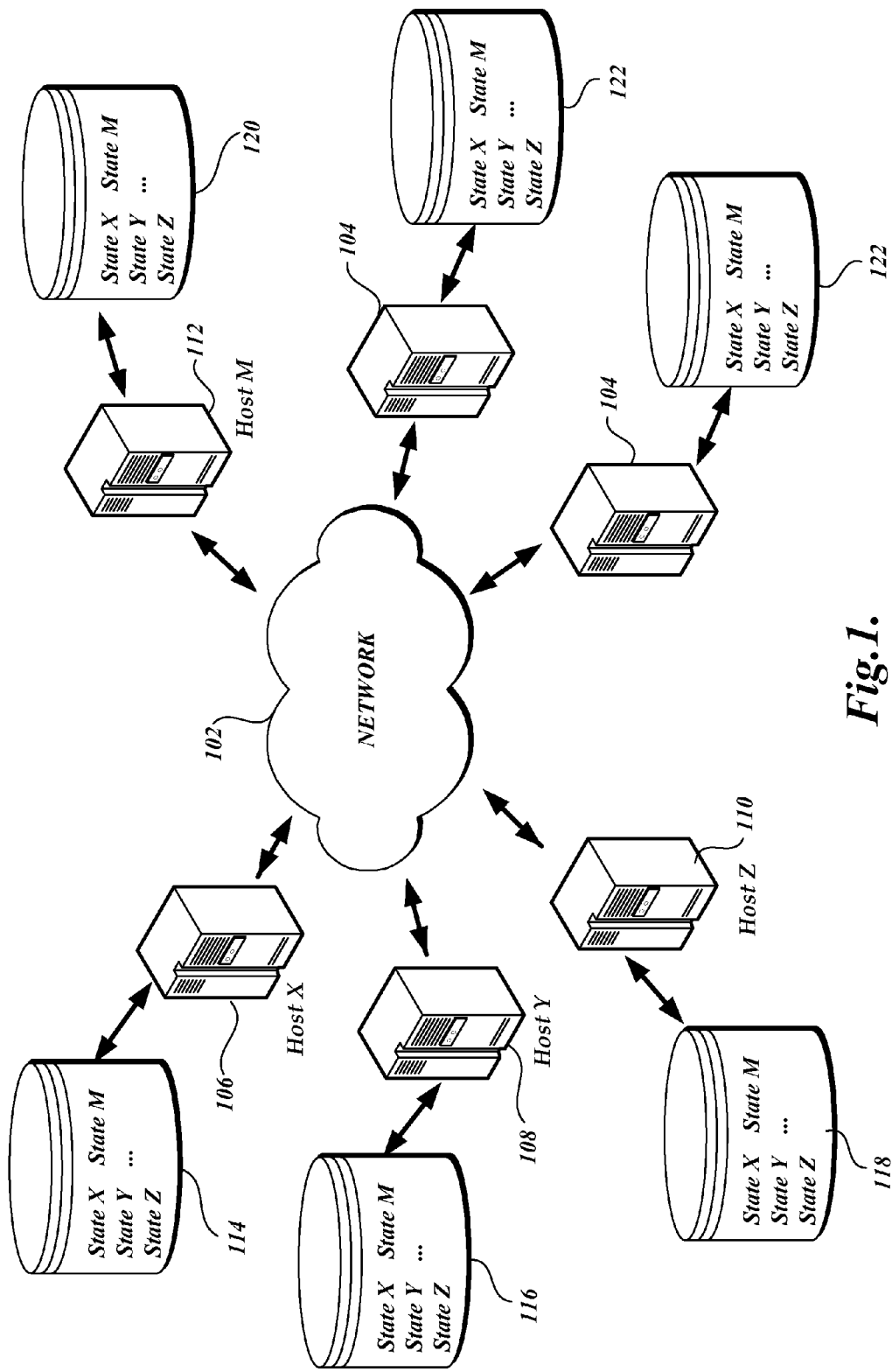
FIG. 1 is an example of a suitable computing environment in which the invention may be implemented in accordance with an aspect of the present invention.

Generally described, the present invention relates to systems and methods for replicating information among host computing devices connected through a network. In one aspect, the present invention relates to a protocol for updating variable values corresponding to state information on a target host computing device with variable values of the same state provided by another connected host computing device. The updated variable values on the targeted host computing device are associated with variable values on the connected host computing device having a greater version than the maximum variable version for the state of the host computing device.

To replicate information among host computing devices, a host computing device determines a maximum variable version among a set of variables on a data store. The host computing device compares that maximum variable version with a maximum variable version of a connected host. Variable values are updated on the host computing device from variable values of the connected host if it is determined that the maximum variable version from the connected host computing device is greater. The updated variable values correspond to versions on the connected host computing device greater than the maximum variable version on the host computing device. Alternatively, the host computing device transmits to the connected host variable values of the state if it is determined that the maximum version on the host computing device is greater. The transmitted variable values correspond to versions on the host computing device greater than the maximum variable version on the connected host computing device. The process can be repeated for each separate piece of state information stored on the host computing devices.

In another aspect, the present invention further relates to transmission capabilities for updating the variable information among the host computing devices. In particular, the present invention relates to systems and methods for regulating a distributed transmission rate between the host computing devices and adjusting transmission rates based on determined use. Additionally, the present invention relates to systems and methods for modifying the number of updates to be sent according to network conditions.

When speaking of transmission capabilities, networks transfer variable information among the host computing devices through packets. A packet refers to a unit of information. Dependent on the size, variable information can fill one packet up to many packets. Transmission rates refer to the number of packets sent through the network in a period of time. A transmission window refers to the number of packets that a process can send per round-trip time.

To reduce propagation delay and message loss when replicating information, host computing devices maintain flow control. Flow control mechanisms regulate the number of packets sent through a network. In particular, and with respect to the present invention, host computing devices share transmission rate information with one another. In turn, a distributed transmission rate for the computing devices is determined. The host computing devices adjust transmission rates based on acquiring and releasing transmission rates from one host computing device to another.

In still another aspect, individual host computing devices also reduce propagation delay and message loss when replicating information. Accordingly, host computing devices manage the number of updates sent through a transmission window. The number of updates to be sent by a host computing device increases when no overflow is detected and the host computing device requires more updates to be sent. Alternatively, the number of updates to be sent decreases after overflow is detected.

Although the various aspects of the invention may be practiced together, one skilled in the art will appreciate the disclosed embodiments and combination of aspects of the invention are illustrative in nature and should not be construed as limiting.

FIG. 1 illustrates an example of a suitable computing environment in which the invention can be implemented. The suitable computing environment contains host computing devices 104-112 connected through a network 102. Individual host computing devices 104-112 refer to systems that compute, assemble, store, correlate, or otherwise process information. A host computing device 104-112 can include, but is not limited to, a personal computer, server computer, laptop device, multiprocessor system, microprocessor-based system, network PC, minicomputer, mainframe computer, and a distributed computing environment that includes any of the above systems or the like.

Included within or connected to each computing device is a data store 114-122. Each data store 114-122 maintains state information for any number of computing devices. The state information can relate to itself or information about other connected computing devices. As shown in FIG. 1, host X 106 maintains a data store 114. The data store includes information related to the state of host Y 108, the state of host Z 110, the state of host M 112, etc. Further, host X maintains state information about itself. In one embodiment, each host maintains information on the same states. In another embodiment, each host maintains different states. As will be shown below, the state information is represented by one or more variables. Associated with each variable is a version number. Further, each piece of state information can have the same variables. In another embodiment, each piece of state information can have different variables.

The host computing devices 104-112 communicate with each other through the network 102. The network 102 can include the Internet, an intranet network, a wide area network (WAN), a local area network (LAN), a personal area network (PAN), a wireless local area network (WLAN), and the like. Typically, networks 102 have limited amounts of bandwidth, i.e., the amount of information host computing devices can transmit.

The presented environment is only one example of a suitable computing environment and is not intended to suggest any limitation as to the scope of use or functionality of the invention. Neither should the computing environment be interpreted as having any dependency requirement relating to any one or combination of components illustrated in the exemplary computing environment.

With reference now to specific details of the present invention, host computing devices maintain variables for each state. The variables include information referring to any one of numerous elements used to report on or to control host computing devices 104-112. Such elements include a device, a communication channel, a network station, a program, a bit, or other element. Each variable can also be associated with versions that indicate when the variable value has most recently been updated.

Figures 2A, 2B:
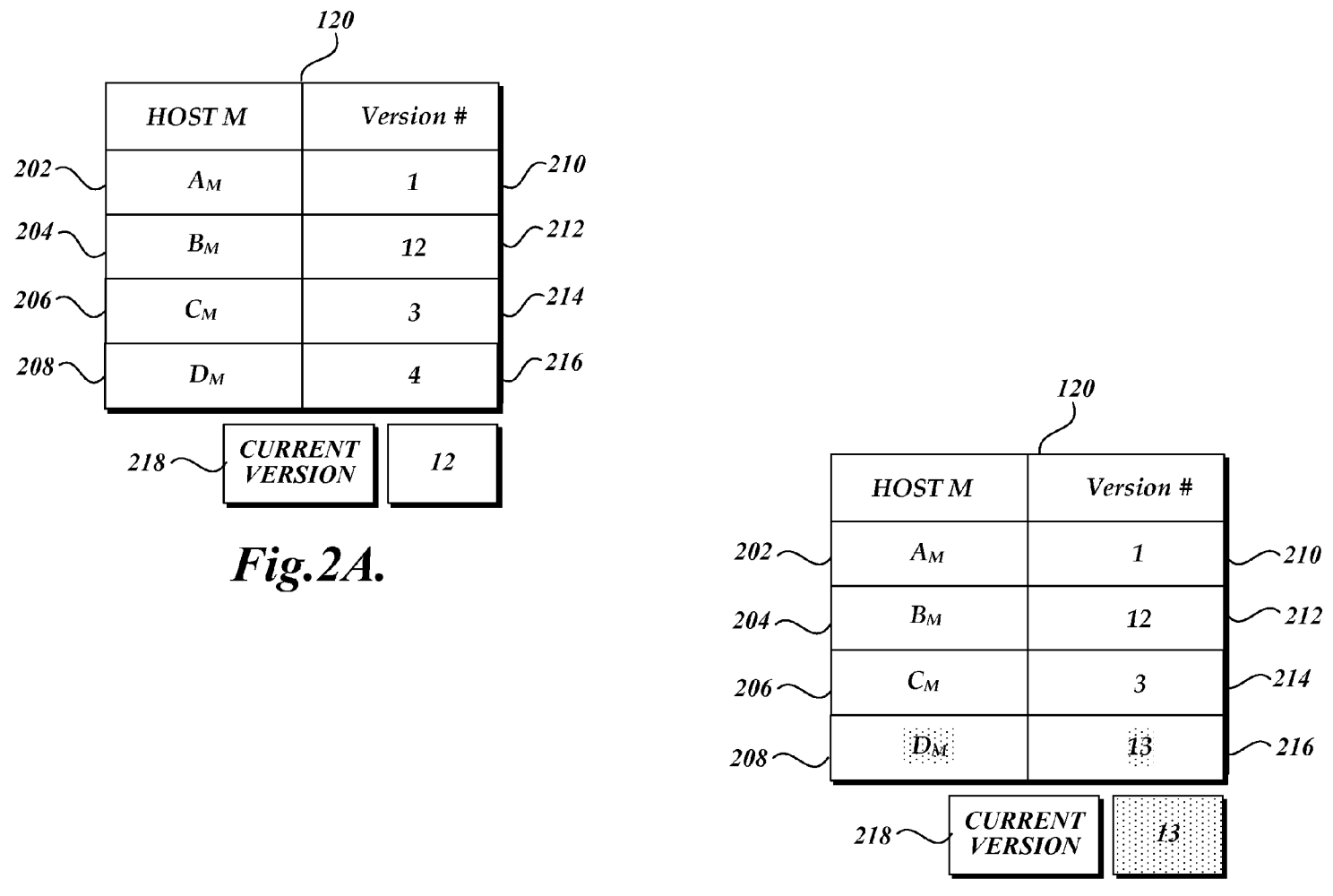

FIGS. 2A and 2B are block diagrams of the data store 120 on host M 112. The data store has variables 202-208 of state information regarding host M. Although depicted in consecutive locations on the diagrams, the set of variables 202-208 can be in non-consecutive locations on the data store 120. Each variable 202-208 within the data store 120 is associated with a variable version 210-216. Versions 210-216 associated with the variables 202-208 represent counters for tracking the variable 202-208. Smaller versions 210-216 are associated with variables that most likely contain out-of-date values, while larger versions 210-216 are most likely associated with variables that are up-to-date. Using smaller and larger versions, variable values of other host's states can be considered "stale" or "fresh" based on the associated version 210-216. It also might be the case that a variable has not received any up-to-date value as well. One skilled in the art would interpret the present invention as including many methods and techniques for determining whether variable versions 210-216 are "stale" or "fresh."

Host computing devices 112 also maintain information on the current version 218 of a state on a data store 120. The current version 218 corresponds to a maximum version 210-216 associated with the one or more variables 202-208 of the state on the data store 120.

FIG. 2A illustrates a block diagram for the data store 120 of host computing device M 112 regarding state M. Although only one state, state M, is shown, one of ordinary skill in the art would understand that the data store 120 includes multiple states. For purposes of illustration, the diagram shows a variable "$A_M$" 202 regarding state M having a version 210 of "1," variable "$B_M$" 204 regarding state M having a version 212 of "12," variable "$C_M$" 206 regarding state M having a version 214 of "3," and variable "$D_M$" 208 regarding state M having a version 216 of "4." The version 212 "12" represents the current version 218 because "12" is the maximum version among the variables 202-208. Although four variables are presented, this is for illustrative purposes and one skilled in the art would appreciate that a host computing device may contain a single variable up to any number of variables.

FIG. 2B illustrates a block diagram after changing a variable "$D_M$" value 208 regarding state M on the data store 120 of host computing device M 112. In the present illustration, the host computing device M 112 directly changes the variable value "$D_M$" 208. More than one variable 202-208 can be changed at a time. In an illustrative embodiment, no variable 202-208 can have the same version 210-216 on the same host. After changing the variable value 208 on host computing device M 112, the variable "$D_M$" 208 is given a new version 216 of "13." The version corresponds to an incremented value of the last current version for state M and is the new current version.

Figure 3A:
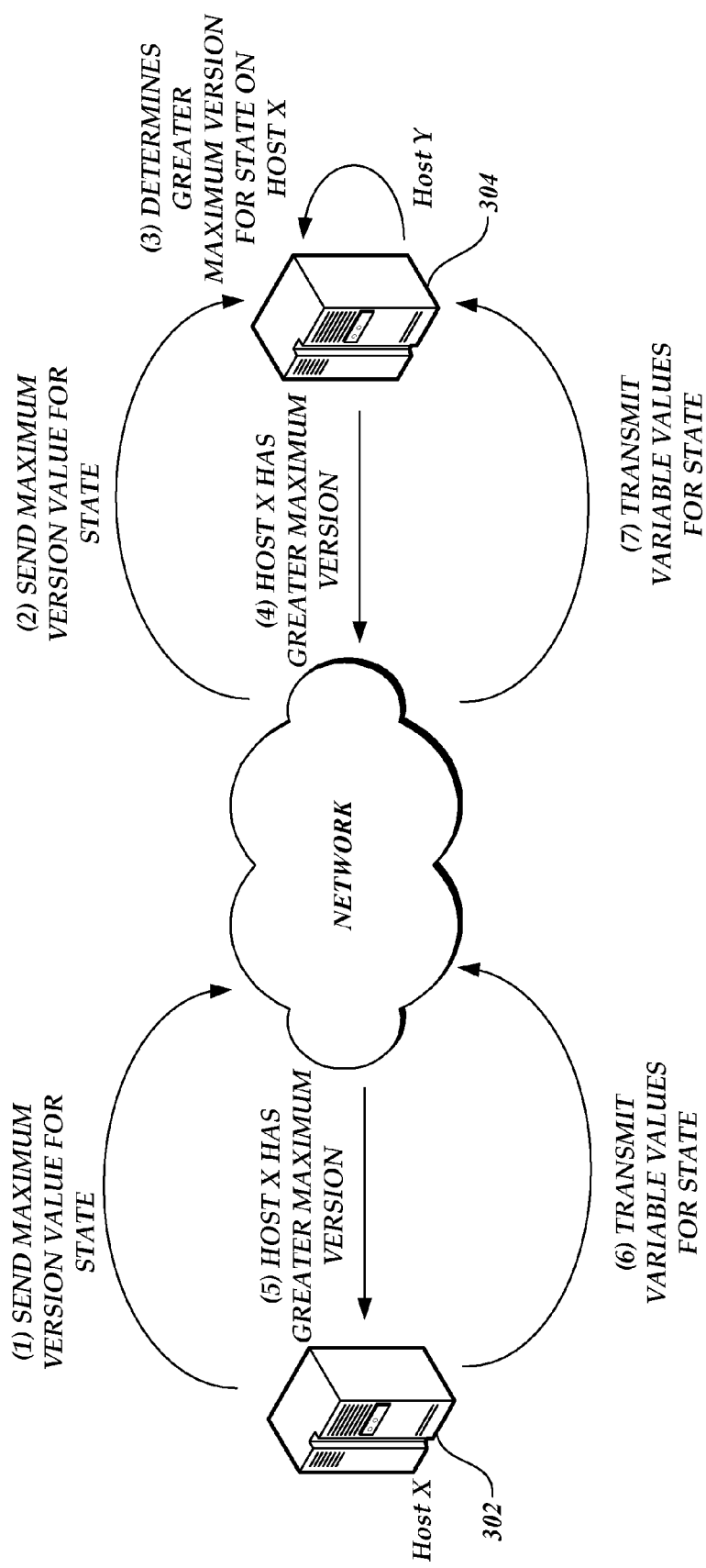
FIGS. 3A and 3B pictorially represent events taken by host computing devices for reconciling state information based on maximum version values on each host in accordance with an aspect of the present invention.
Figure 3B:
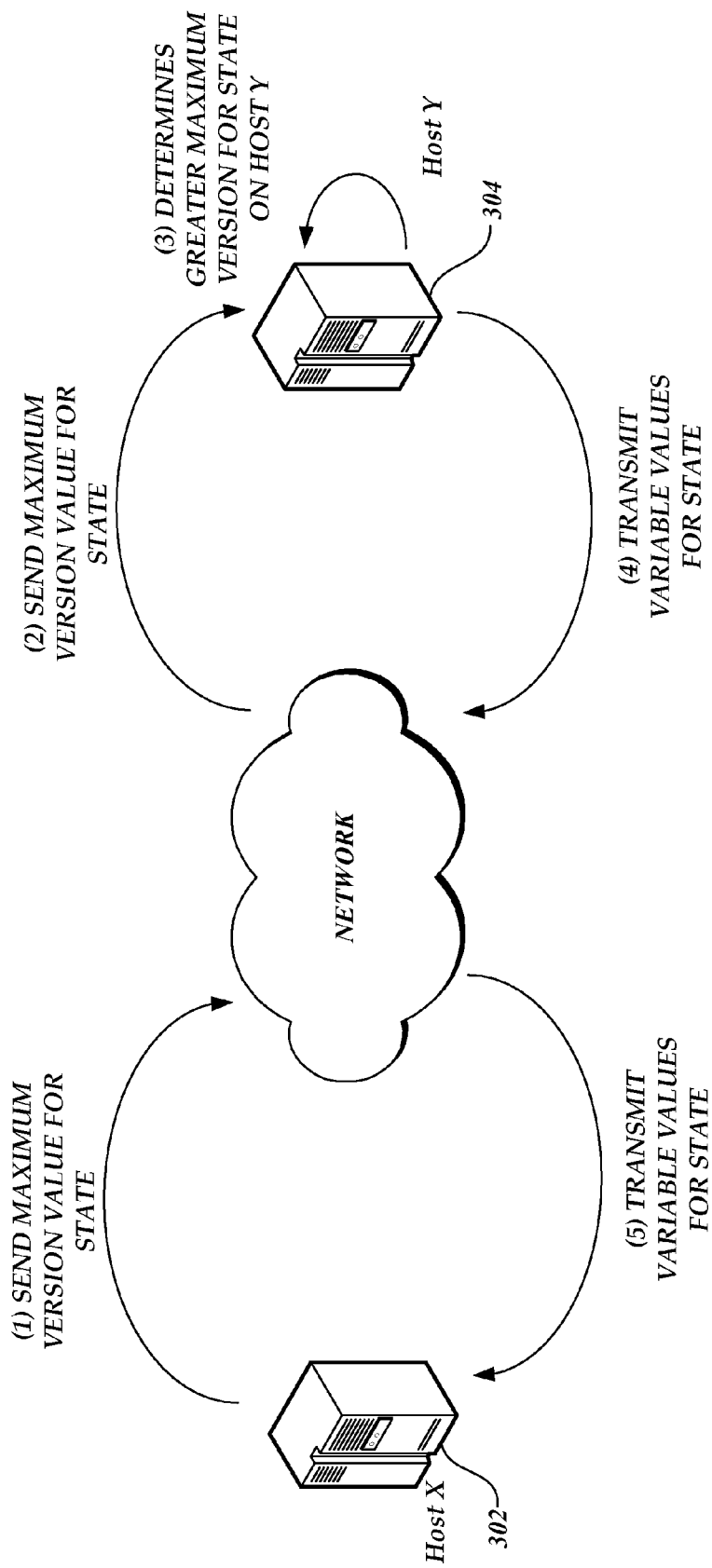

Once the variable 208 of state M has been changed on host computing device M 112, the information is propagated to other host computing devices so that other host computing devices can update local data stores with the current state of M. FIGS. 3A and 3B represent pictorial diagrams of host computing devices reconciling information based on maximum version values of associated pieces of state information. FIG. 3A represents host Y 304 updating variable values of state M from host X 302 based on host X 302 having a maximum version value of state M greater than host Y 304. At the beginning, host X 302 sends the maximum version value of state M through a network to the intended recipient host Y 304. Host Y 304 receives the maximum version value. Host Y 304 determines that host X 302 has a greater maximum version of state M. Following, host Y 304 requests variable values of state M from host X 302 based on host X 302 having a greater maximum version. In turn, host X 302 responds by transmitting variable values of state M to host Y 304 having a version greater than the maximum version of host Y.

In another embodiment, FIG. 3B represents host Y 304 transmitting variable values of state M to host X 302 based on host Y 304 having a greater maximum version of state M than host X 302. Similar to the previous embodiment, host X 302 sends its maximum version of state M through a network to intended recipient host Y 304 and host Y 304 receives the maximum version. Host Y 304 determines its maximum version of state M is greater than the received maximum version of state M from host X 302. As a result, host Y 304 transmits variable values of state M to host X 302 having versions greater than the maximum version received of state M from host X 302.

Figure 4:
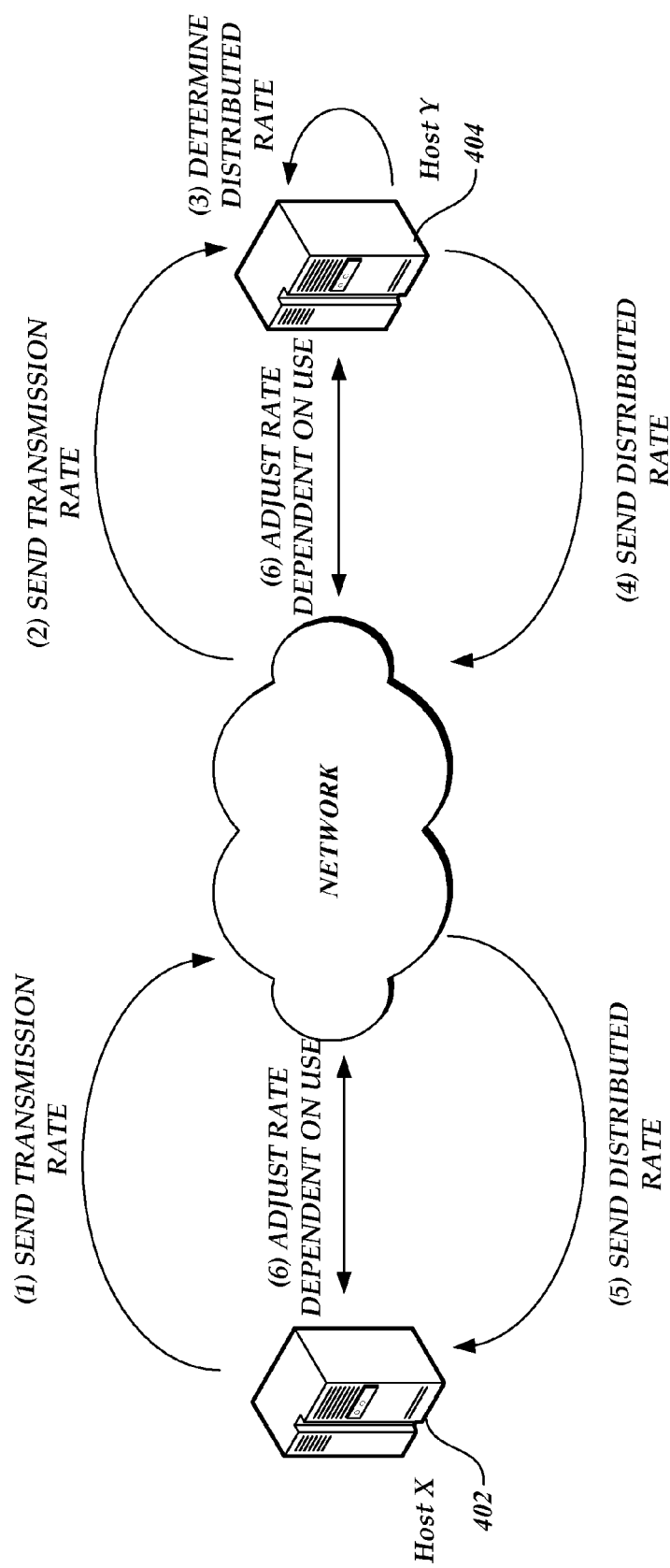
FIG. 4 pictorially represents host computing devices establishing a distributed transmission rate and adjusting the rate corresponding to determined use in accordance with an aspect of the present invention.

Before reconciling information, flow control is maintained in order to prevent propagation delay and message loss. FIG. 4 pictorially represents regulating transmission rates for the host computing devices while adjusting transmission rates based on determined use. At the beginning, host X 402 sends transmission rate information through a network to host Y 404. Host Y 404 receives the transmission rate from the network. Host Y 304 determines a distributed transmission based on the received transmission rate and its own transmission rate. Host Y 404 then sends the distributed rate to host X 402. Each host can request or release an additional transmission rate based on use.

Figure 5A:
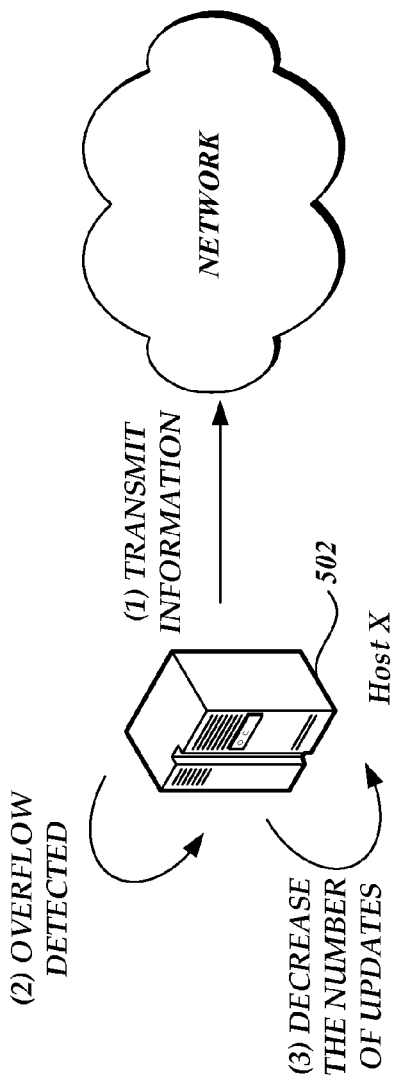
FIGS. 5A and 5B represent a host computing device adjusting the number of produced updates to be sent based on network conditions in accordance with an aspect of the present invention.
Figure 5B:
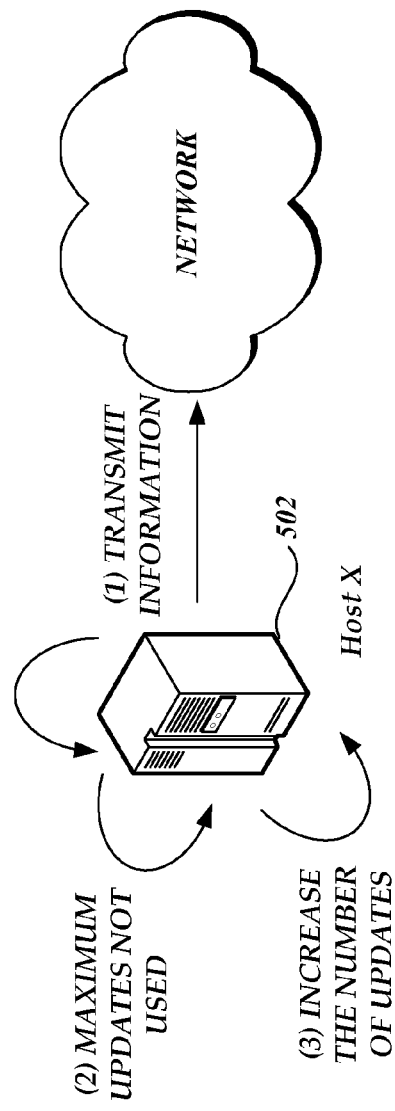

FIGS. 5A and 5B pictorially represent individual host computing devices adjusting the number of updates produced to be sent over a transmission window based on network conditions to further manage flow control. A transmission window refers to the number of updates or packets that a process can send per round-trip time. FIG. 5A represents host X 502 detecting an overflow and reducing the number of produced updates to be sent over a transmission window. As shown, host X 502 transmits information, in the form of updates, over a network. After transmission, an overflow is detected. Overflows are characterized by producing more updates than can be sent over a transmission window. In order to prevent future overflows, the number of updates produced by the host computing device is decreased.

FIG. 5B represents host X 502 successfully transmitting information, in the form of updates, and increasing the number of updates which can be sent. At the beginning, host X 502 successfully transmits information according to a transmission window over the network. Host X 502 determines that no overflow occurred meaning that the number of updates produced by the host were able to be sent within the transmission window. Because the number of produced updates did not create an overflow, host X determines whether the maximum number of updates produced were created. In turn, the number of updates produced from the host is increased when the maximum number of updates produced were not created.

Prior to discussing the details of illustrative embodiments of the invention, it should be understood that the following description is presented largely in terms of steps and operations that may be performed by conventional computer components. These computer components, which may be grouped in a single location or distributed over a wide area, generally include computer processors, memory storage devices, display devices, input devices, etc. Memory storage devices, such as data stores, provide one or more variables that describe numerous elements as presented above. In circumstances where the computer components are distributed, the computer components are accessible to each other via communication links. Further, although the present invention will be described with regard to illustrative embodiments, one skilled in the relevant art will appreciate that the disclosed embodiments are illustrative in nature and should not be construed as limiting.

Figure 6:
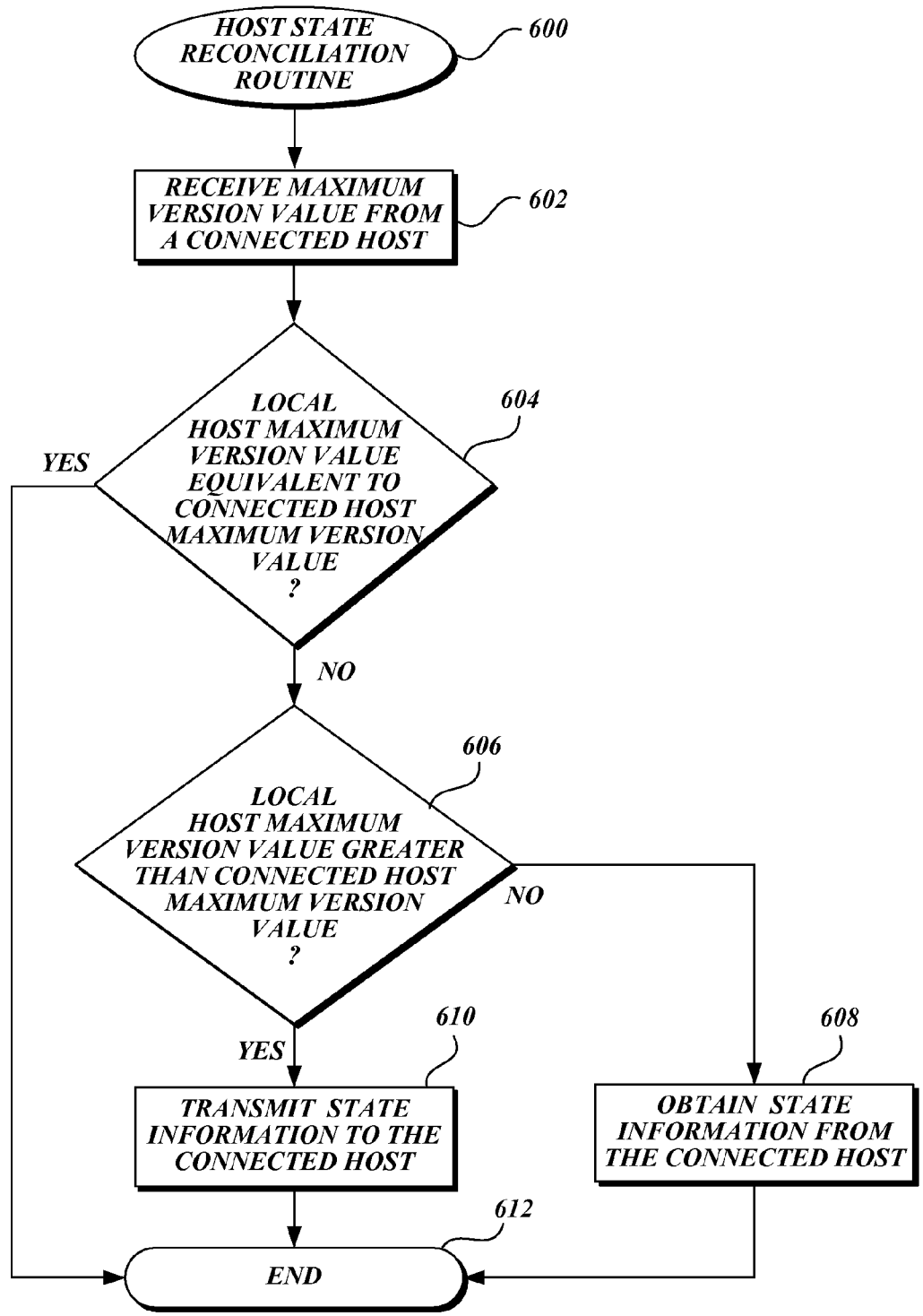
FIG. 6 is a flow diagram for reconciling information between host computing devices in accordance with an aspect of the present invention.

Now referring to FIG. 6, along with illustrative examples in FIGS. 7A, 7B, 8A, and 8B, a routine 600 for reconciling state information between host computing devices is presented. For illustrative purposes, only variables related to a single piece of state information will be discussed. One skilled in the related art will appreciate that the routine 600 can be repeated for each piece of state information in a data store. At block 602, a target host computing device receives a maximum version value of a state from a connected host. Generally, a connected host that recently updated its variables will transmit the new version of the state to other targeted hosts. Alternatively, targeted hosts can actively seek versions from connected hosts. Still yet, both the targeted hosts and the connected hosts may seek and wait for versions from one another.

Figures 7A, 7B:
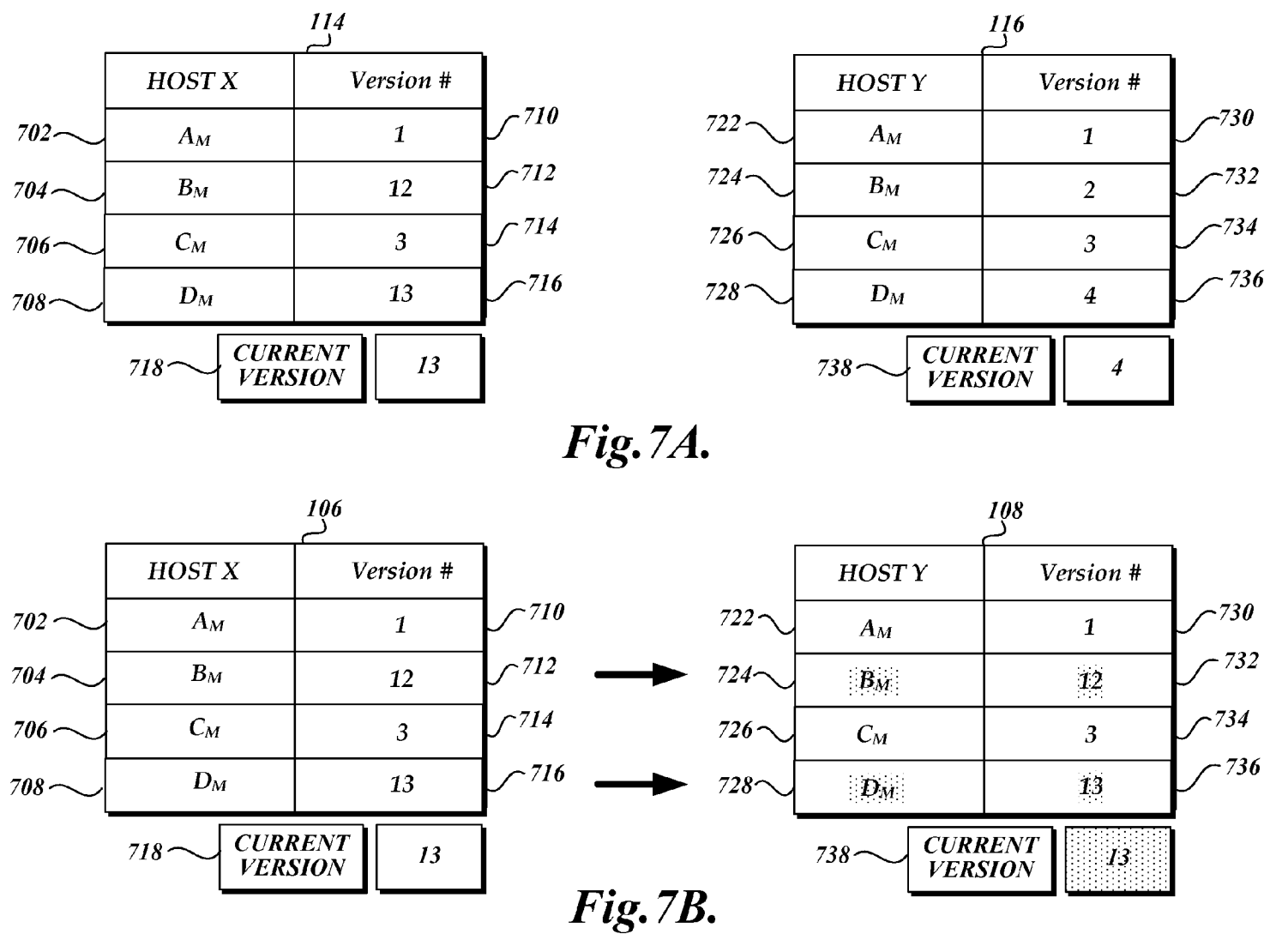

With reference now to FIG. 7A, an illustrative example will be presented. In FIG. 7A, host X 106 includes state M variables "$A_M$" 702, "$B_M$" 704, "$C_M$" 706, and "$D_M$" 708 associated with versions "1" 710, "12" 712, "3" 714, and "13" 716, respectively. Host X 106 also maintains a state M current version 718 "13" which is associated with the maximum version of the variables. Host computing device Y 108 includes state M variables "$A_M$" 722, "$B_M$" 724, "$C_M$" 726, and "$D_M$" 728 associated with versions "1" 730, "2" 732, "3" 734, and "4" 736, respectively. Host Y 108 maintains a "4" for the state M current version 738 which is associated with the maximum version of the variables. In this illustration, host Y 108 receives host X's 106 state M current version of "13."

Returning to FIG. 6, at decision block 604 of routine 600, the target host determines whether the maximum versions of the associated states are equivalent. In cases where the maximum versions are equivalent, host computing devices have corresponding variable values of the state with the same versions. However, not all variable values must be equivalent. When the maximum versions are equivalent, routine 600 terminates at block 612. Continuing with the illustration above, host X 106 has a version of "13" for state M. Host Y 108 has a version of "4" for state M. Because the maximum versions are not equivalent, routine 600 does not terminate.

Alternatively, when the maximum versions of associated state information are not equivalent, the targeted host determines whether the maximum version on the connected host is greater than the maximum version on the targeted host at block 606. When a determination is made that the maximum version on the targeted host is less than the received maximum version from the connected host, variable values are updated on the targeted host at block 608. Accordingly, a request for variable values from the targeted host is made to the connected host. The variable values requested from the connected host correspond to variables having versions greater than the maximum version on the targeted host computing device. Once the variable values are received, the variable values are updated along with the associated variable versions from the connected host.

Continuing with the previous illustration in FIG. 7A, FIG. 7B illustrates updating variables for state M on host computing device Y 108 received from host computing device X 106. Host computing device X 106 has a current version 718 of "13" which is greater than the current version 738 of "4" on host computing device Y 108 for state M. In accordance with routine 600, variable values for state M on host computing device Y 108 are updated that correspond to versions on host computing device X 108 having a greater version than "4." In particular, variable "$A_M$" 702 on host computing device X 106 has a version of "1" 710 and therefore variable "$A_M$" 722 on host computing device Y 108 is not updated because "1" is not greater than "4." Variable "$B_M$" 704 on host computing device X 106 has a version of "12" 712 and therefore variable "$B_M$" 724 on host computing device Y 108 is updated because "12" is greater than "4." Variable "$C_M$" 706 on host computing device X 106 has a version 714 of "3" and therefore variable "$C_M$" 726 on host computing device Y 108 is not updated because "3" is not greater than "4." Variable "$D_M$" 708 on host computing device X 106 has a version 716 of "13" and therefore variable "$D_M$" 728 on host computing device Y 108 is updated because "13" is greater than "4."

Returning again to FIG. 6, when the maximum version value of a state on the targeted host computing device is greater than the maximum version of the corresponding state on the connected host, the variable values of the state on the targeted host computing device are transmitted to the connected host computing device at block 610. Similar to above, not all variable values are transmitted. The transmitted variable values correspond to variable values of the state on the target host computing device having a version greater than the maximum version for the corresponding state on the connected host computing device. Each transmitted variable value is also associated with the variable version from the target host computing device.

In accordance with the present invention, variable values can be transmitted or updated simultaneously. Alternatively, variable values are sent based on versions. The lowest version between the maximum version on the host computing device and the maximum version on the connected host computing device is updated or transmitted first. Then the next highest version is updated or transmitted until no variable values remain.

Figures 8A, 8B:
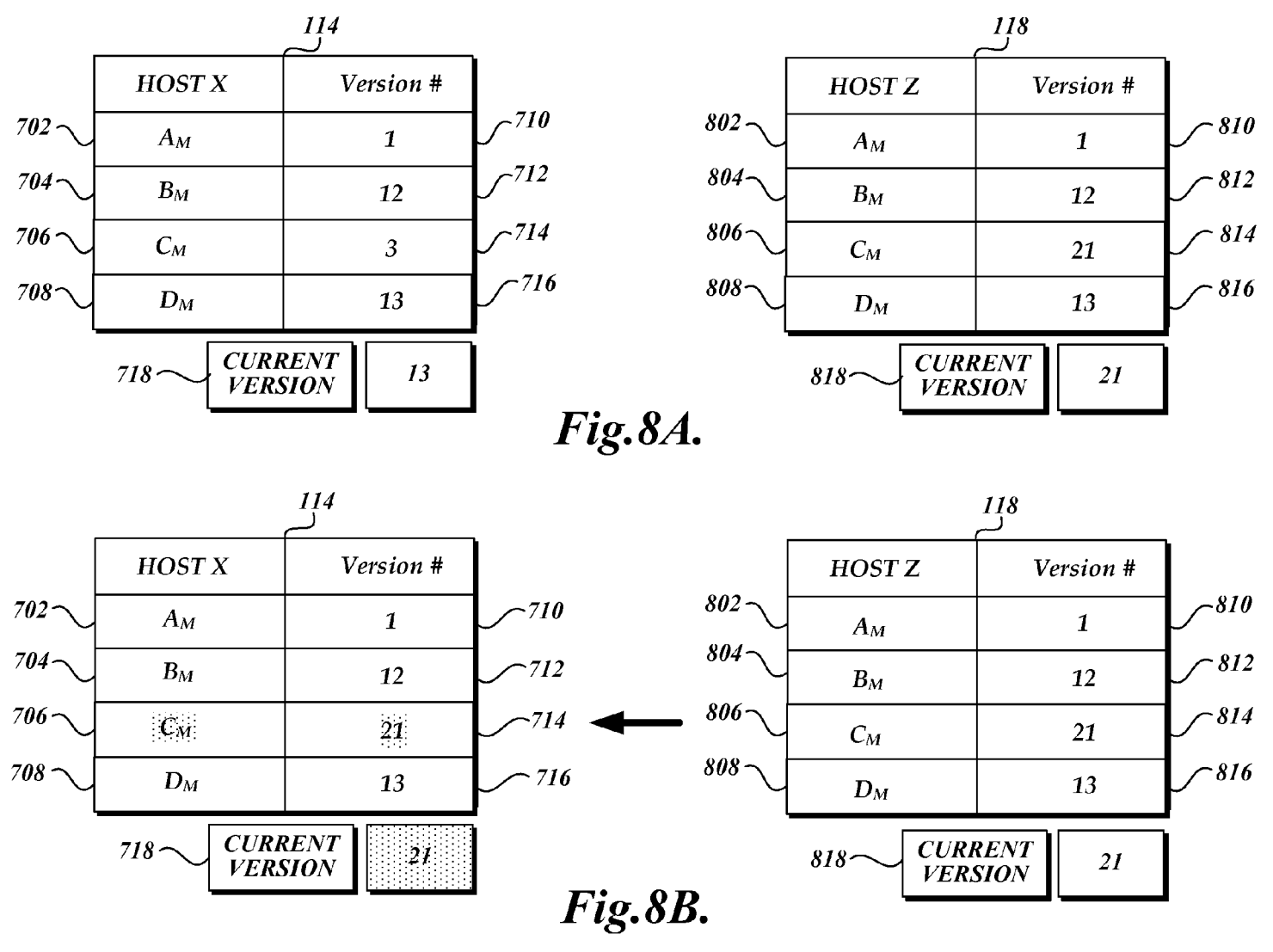

As a further example of the invention, FIGS. 8A and 8B introduces a new host computing device Z 110. As shown in FIG. 8A, variable "$A_M$" 802 on host computing device Z 110 has a version 810 of "1." Variable "$B_M$" 804 on host computing device Z 110 has a version 812 of "12." Variable "$C_M$" 806 on host computing device Z 110 has a version 814 of "21." Variable "$D_M$" 808 on host computing device Z 110 has a version 816 of "13."

FIG. 8B shows updating variable value "$C_M$" 806 on host computing device X 106. The maximum version on host computing device X 106 is "13," while the maximum version on host computing device Z is "21." Using the maximum version values on each host computing device for state M, variable "$C_M$" 706 on host computing device X 106 is changed to the value of variable "$C_M$" 806 from host computing device Z 110. The associated version 214 is changed to "21."

Returning back to FIG. 6, routine 600 terminates at block 612. By repeating the routine for each host within the number of connected hosts, eventually all host computing devices 104-110 will receive updated variable values regarding state M. In addition, the routine can be repeated to update multiple states contained within the data stores of each host computing device.

Figure 9:
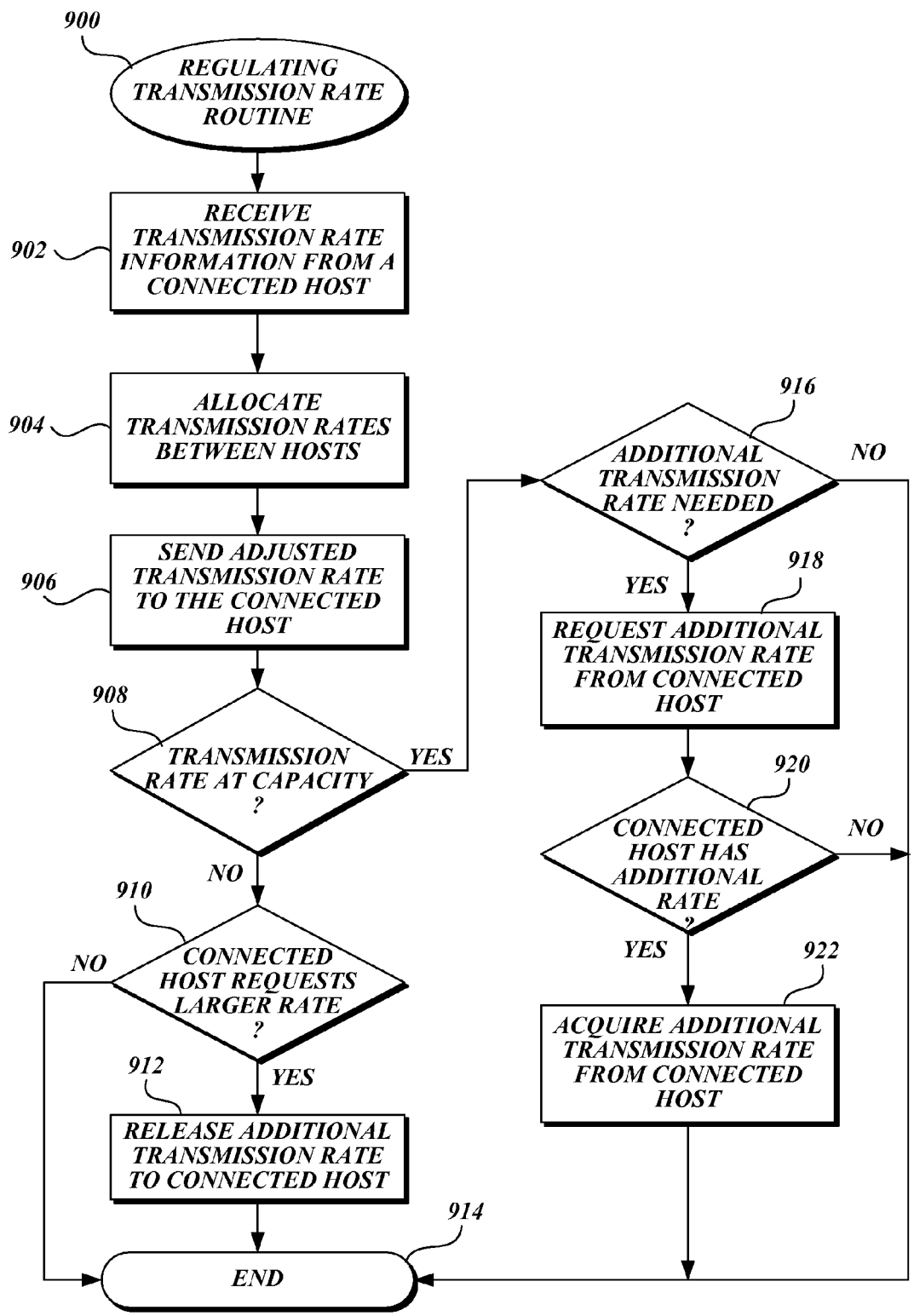
FIG. 9 is a flow diagram for establishing transmission rates for host computing devices in accordance with an aspect of the present invention.

In another aspect of the invention to transfer variable information over the network, flow control is established between the host computing devices. Returning to FIG. 4, host computing device X 402 and host computing device Y 404 determine a distributed transmission rate between them. Each communicates adjustments of transmission rates required by one another. FIG. 9 is a flow diagram for routine 900 establishing a distributed transmission rate for the two host computing devices and adjusting individual rates based on determined use. Below, routine 900 will be viewed from host computing device Y's 404 perspective.

At block 902, transmission rate information is received from connected host computing device X 402 by host computing device Y 404. After receiving the transmission rate information, host computing device Y 404 allocates transmission rates between the two host computing devices at block 904. In an illustrative embodiment, allocation of the distributed transmission rate is based on an average in which host Y 404 adds the transmission rate each host computing device uses and divides the transmission rate in half. Alternatively, allocating the distributed transmission rate can be based on a number of factors. For instance, allocation of a distributed transmission rate can be based on the number of packets updated and transmitted by each host computing device. Through this method, the size of the host is not relative, only the amount of data that is actually distributed. An additional factor can be based on bandwidth previously taken by each host computing device. Further, priorities can be given when allocating the distributed transmission rates. Still further, either host may specify the transmission rate at which they will transfer at. For example, if host X 402 specifies that its maximum transmission rate will be fifty packets per second, then host X will not be allocated a transmission rate greater than fifty packets per second. At block 906, which is optional, the distributed transmission rate is sent to host computing device X 402.

At decision block 908, host computing device Y 404 determines whether it is using the distributed transmission rate at full capacity. Accordingly, host Y 404 may not be able to use the total allocated capacity because of the lack of information to send. Because the full capacity is not being used, host X 402 may borrow either part or the whole allocated transmission rate depending on host Y's 404 permission.

At decision block 910, host Y 404 determines whether host X 402 requires an additional transmission rate when host Y 404 is not completely using the allocated distributed transmission rate. Through this method, host X 402 must ask for permission before host Y 404 releases any of the allocated distributed transmission rate. In an embodiment, the portion of the released allocated distributed transmission rate is temporarily released. In another embodiment, the released allocated distributed transmission rate is permanently released. When host Y 404 has the requested additional transmission rate, the additional rate is released to host X 402 at block 912. The routine 900 ends at block 914.

In the event that transmission rate is at capacity at decision block 908, host computing device Y 404 determines whether an additional transmission rate is needed at decision block 916. Additional transmission rate can be needed if significant amounts of packets still need to be sent or there is a specific amount of time in which the host may send the information out. Further, host Y 404 may simply want to send more packets while additional transmission rate is available.

Host computing device terminates routine 900 when host computing device Y 404 does not need an additional transmission rate. When an additional transmission rate is needed, however, host computing device Y 404 requests from host computing device X 402 for an additional transmission rate at block 918. By requesting the additional transmission rate from host X 402, individual hosts are in control of their transmission rates. In turn, the request is answered by host computing device X 402 at decision block 920. The routine 900 terminates at block 914 if host computing device X 402 cannot release the additional transmission rate. Otherwise, the additional transmission rate is acquired by host computing device Y 404 at block 922. Routine 900 ends at block 914.

One skilled in the art would appreciate that several exchanges using routine 900 take place throughout the course of propagating information to each host. The dynamic adjustments may occur after one update/transmission or multiple updates/transmissions. Repeating each step of 900 for each host computing device allows them to dynamically change their transmission information based on a distributed transmission rate.

Figure 10:
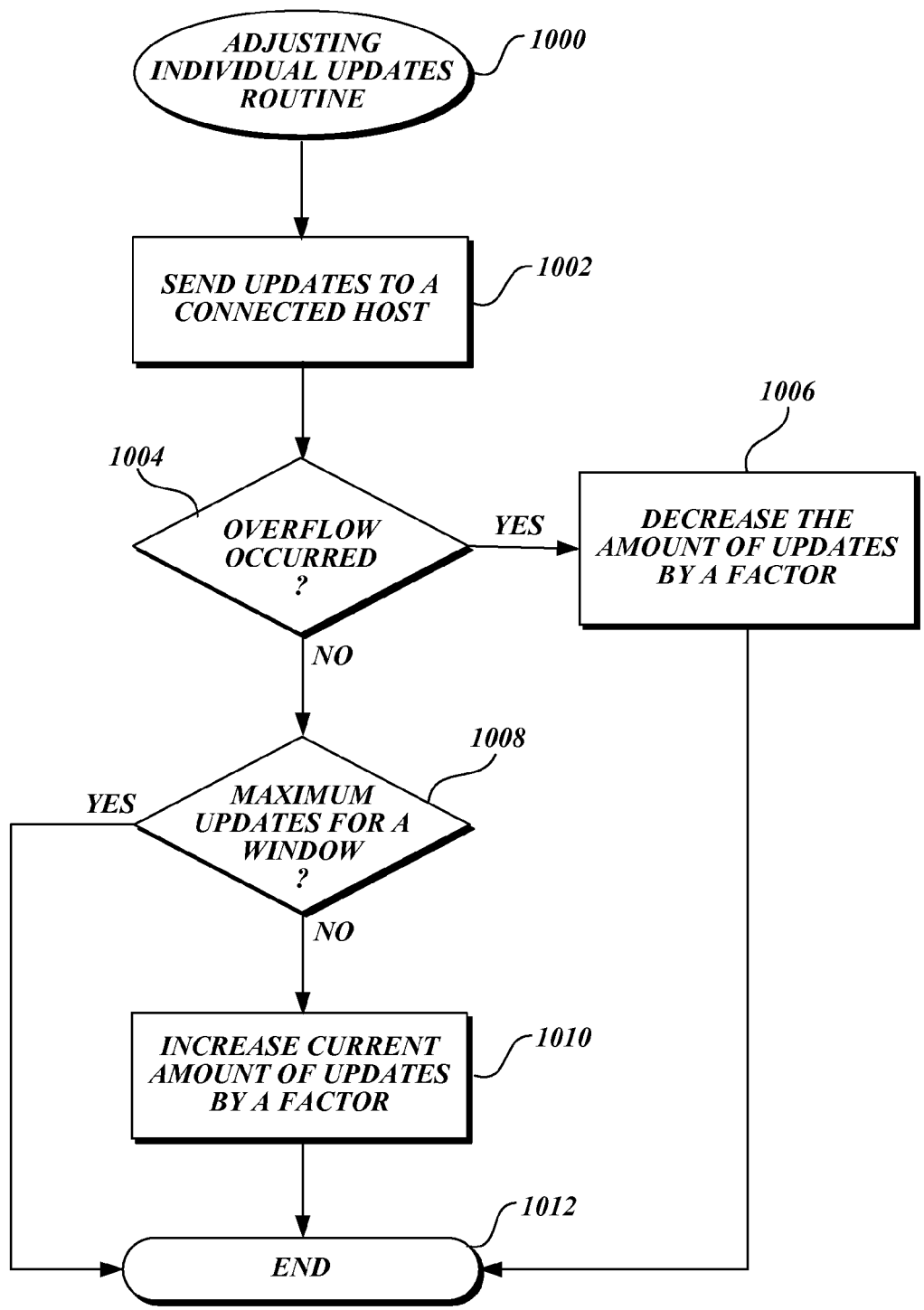
FIG. 10 is a flow diagram for adjusting the number of updates to be sent by a host computing device based on network conditions in accordance with an aspect of the present invention.

In still a further aspect of the invention, individual host computing devices can also implement flow control procedures. Individually, host computing devices continuously generate updates for pending transmissions. Returning to FIGS. 5A and 5B, host computing device X 502 adjusts the number of produced updates to be sent over a transmission window based on network conditions. Recall that transmission window refers to the number of updates or packets that a process can send per round-trip time. In the present illustration, the transmission window is fixed. However, one skilled in the ordinary art would understand that the transmission windows vary with bandwidth usage by other computing devices. FIG. 10 is a flow diagram for routine 1000 on a host computing device that adjusts the number of updates to be sent through a transmission window.

Beginning at block 1002, a host X 502 sends updates or packets to a connected host through a network. The updates are sent within a transmission window. During transmission of the updates, host X 502 continues to create additional updates to send.

At decision block 1004, the host computing device determines that an overflow occurred. Accordingly, an overflow occurs when a host computing device has more updates than can be sent through the transmission window. For example, a transmission window maintains 100 updates per second, while the host computing device creates 120 updates per second. An overflow occurs because the creation of 120 updates per second is larger than the transmission window of 100 updates per second.

At block 1006, host X 502 decreases the amount of updates produced by a factor if an overflow was detected. The factor reducing the number of updates for the transmission window can be multiplicative or linear. Continuing with the example above, the number of updates can be decreased to 80 updates per second. After reducing the number of updates, less congestion and message losses occur over the network. Routine 1000 ends at block 1012.

In the event of no overflow occurrence at decision block 1004, host X 502 determines whether the maximum number of updates that the host can send through the transmission window has been reached at decision block 1008. Returning to the example, the maximum number of updates for the transmission window would be 100 updates per second. Routine 1000 terminates at block 1012 if the maximum number of updates is reached.

When the maximum number of updates that the host can send through the transmission window has not been reached at decision block 1008, host X 504 increases the amount of updates by a factor at block 1010. Again, the factor can be multiplicative or linear. For example, the host, from the previous example, can increase the rate to 90 updates per second. Routine 1000 terminates at block 1012.

Preferably, routine 1000 includes a multiplicative decrease in updates if an overflow occurred and an additive increase in updates if no overflow occurred. Using this method allows the host computing device to adjust to network conditions. Accordingly, overflows are characterized by significant data loss and propagation delay. Normal network conditions return faster when host computing devices decrease their updates dramatically after an overflow occurred. As an illustration of the multiplicative decrease, additive increase method for adjusting updates using the previous illustration, updates would be decreased to 40 updates per second if an overflow occurred. After the multiplicative decrease, the updates would additively increase by one update per second for each successful transmission.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a communication system including a plurality of host computing devices, a method for regulating transmission rates for the plurality of host computing devices, wherein each host includes a transmission rate and state information having one or more variables about a host computing device, each variable having a version for tracking information, the method comprising:
   obtaining a remote transmission rate from a connected host;
   determining a distributed transmission rate, wherein the distributed transmission rate corresponds to the remote transmission rate and a current transmission rate;
   obtaining a remote current variable version value from the connected host, wherein the remote current variable version value corresponds to a maximum version value for one or more variables of corresponding state information about the host computing device on a remote data store;
   determining whether the remote current variable version value is greater than a current variable version value, wherein the current variable version value corresponds to a maximum version value for one or more variables on a data store;
   updating variable values for the state information about the host computing device on the data store according to the distributed transmission rate corresponding to variable values on the remote data store if the variables from the remote data store are associated with a version greater than the current variable version value of the data store;
   transmitting to the connected host according to the distributed transmission rate variable values for the state information about the host computing device on the data store having a version greater than the remote current variable version value; and
   adjusting the distributed transmission rate based on at least one of: average transmission rate of the host computing devices, number of packets updated and transmitted by each of the host computing devices, bandwidth previously taken by each of the host computing devices, a priority assigned to each of the host computing devices, and a maximum transmission rate specified by at least one of the host computing devices.

2. The method of claim 1, wherein obtaining the remote transmission rate from the connected host comprises establishing communication through a network with the connected host.

3. The method of claim 1, wherein determining a distributed transmission rate comprises dividing in half the sum of the remote transmission rate and the current transmission rate.

4. The method of claim 1, wherein determining a distributed transmission rate comprises dividing the sum of the remote transmission rate and the current transmission rate by a factor.

5. The method of claim 4, wherein dividing the sum of the remote transmission rate and the current transmission rate by a factor, the factor corresponding to a number of variable values updated and transmitted.

6. The method of claim 4, wherein dividing the sum of the remote transmission rate and the current transmission rate by a factor, the factor corresponding to previous use.

7. The method of claim 5, wherein dividing the sum of the remote transmission rate and the current transmission rate by a factor, the factor corresponding to priority determinations.

8. The method of claim 1, wherein determining a distributed transmission rate comprises allocating a transmission rate of a host up to a specified maximum transmission rate of the host.

9. The method of claim 1, wherein adjusting the distributed transmission rate includes increasing the current transmission rate.

10. The method of claim 9, wherein increasing the current transmission rate includes acquiring an additional transmission rate from the connected host, wherein the connected host has the additional transmission rate for use.

11. The method of claim 1, wherein adjusting the distributed transmission rate includes decreasing the current transmission rate.

12. The method of claim 11, wherein decreasing the current transmission rate includes releasing an additional transmission to the connected host when the connected host requires the additional transmission rate for use and the current transmission rate is not used at capacity.

13. The method of claim 1, wherein adjusting the distributed transmission rate occurs during each updating of a variable value.

14. The method of claim 1, wherein adjusting the distributed transmission rate occurs during each transmitting of a variable value.

15. The method of claim 1, wherein adjusting the distributed transmission rate occurs during each updating of multiple variable values.

16. The method of claim 1, wherein adjusting the distributed transmission rate occurs during each transmitting of multiple variable values.

17. A computer-readable media storing instructions for causing at least one processor to perform a method for regulating transmission rates for a plurality of host computing devices, the method comprising:
   obtaining a remote transmission rate from a connected host;
   determining a distributed transmission rate, wherein the distributed transmission rate corresponds to the remote transmission rate and a current transmission rate;
   obtaining a remote current variable version value from the connected host, wherein the remote current variable version value corresponds to a maximum version value of state information on a remote data store, the state information associated with one or more variables about a host computing device on the remote data store with each variable having a version;
   determining whether the remote current variable version value is greater than a current variable version value, wherein the current variable version value corresponds to a maximum version value of the state information on a data store, the state information associated with one or more variables about the host computing device on the data store with each variable having a version;
   updating variable values for the state information about the host computing device on the data store with variable values of the state information about the host computing device on the remote data store according to the distributed transmission rate if the remote current variable version value is greater than the current variable version value;

transmitting the variable values for the state information about the host computing device to the remote data store according to the distributed transmission rate if the current variable version value is greater than the remote current variable version value; and adjusting the distributed transmission rate based on at least one of transmission rate information, host computing device bandwidth information and data previously transmitted to the remote data store.

18. The computer-readable media of claim 17, wherein adjusting the distributed transmission rate includes increasing the current transmission rate.

19. The computer-readable media of claim 18, wherein increasing the current transmission rate includes acquiring an additional transmission rate from the connected host, wherein the connected host has the additional transmission rate for use.

20. The computer-readable media of claim 17, wherein adjusting the distributed transmission rate includes decreasing the current transmission rate.

21. The computer-readable media of claim 20, wherein decreasing the current transmission rate includes releasing an additional transmission to the connected host when the connected host requires the additional transmission rate for use and the current transmission rate is not used at capacity.

22. The computer-readable media of claim 17, wherein the transmission rate information comprises average transmission rate of the host computing devices.

23. The computer-readable media of claim 17, wherein the transmission rate information comprises number of packets updated and transmitted by each of the host computing devices.

24. The computer-readable media of claim 17, wherein the host computing device bandwidth information comprises bandwidth previously taken by each of the host computing devices.

25. The computer-readable media of claim 17, wherein the host computing device bandwidth information comprises a priority assigned to each of the host computing devices.

26. The computer-readable media of claim 17, wherein the host computing device bandwidth information comprises a maximum transmission rate specified by at least one the host computing devices.

27. The computer-readable media of claim 17, wherein data previously transmitted to the remote data store.

* * * * *